United States Patent [19]

Bauer

[11] Patent Number: 4,903,971
[45] Date of Patent: Feb. 27, 1990

[54] SEAL FOR BEARING BUSHINGS

[75] Inventor: Bernhard Bauer, Hassfurt, Fed. Rep. of Germany

[73] Assignee: SKF GmbH, Schweinfurt, Fed. Rep. of Germany

[21] Appl. No.: 260,618

[22] Filed: Oct. 20, 1988

[30] Foreign Application Priority Data

Nov. 10, 1987 [DE] Fed. Rep. of Germany ... 8714948[U]

[51] Int. Cl.⁴ .............................................. F16C 33/78
[52] U.S. Cl. .................................... 277/152; 277/208; 277/215; 384/486
[58] Field of Search ........................ 277/35, 37, 45, 47, 277/48, 50, 95, 152, 153; 384/130, 139, 140, 143, 147, 148, 477, 481, 482, 484–486

[56] References Cited

U.S. PATENT DOCUMENTS

| | | |
|---|---|---|
| 4,037,849 | 7/1977 | Thumm ..................................... 277/36 |
| 4,512,672 | 4/1985 | Olschewski et al. ........... 277/152 X |
| 4,688,805 | 8/1987 | Crotti et al. ..................... 277/152 X |

FOREIGN PATENT DOCUMENTS 867005  5/1961  United Kingdom ................ 384/486

Primary Examiner—William A. Cuchlinski, Jr.
Assistant Examiner—Scott Cummings
Attorney, Agent, or Firm—Eugene E. Renz, Jr.

[57] ABSTRACT

A seal for sealing the space between a bearing bushing and the journal of a machine part supported therein and a seal consisting of an inner sealing ring between the bearing bushing and the journal and an outer sealing ring located between the open end of the bearing bushing and a shoulder of the machine part supported in the bearing bushing and which has an axially oriented section on the inner side facing the inner sealing ring, having a concentric bore, said inner sealing ring (12) having a sleeve-like section (22) pressed onto a stepped portion of the journal (3) and wherein said pressed-on section (22) is located in the bore (21) of the outer sealing ring (11).

4 Claims, 1 Drawing Sheet

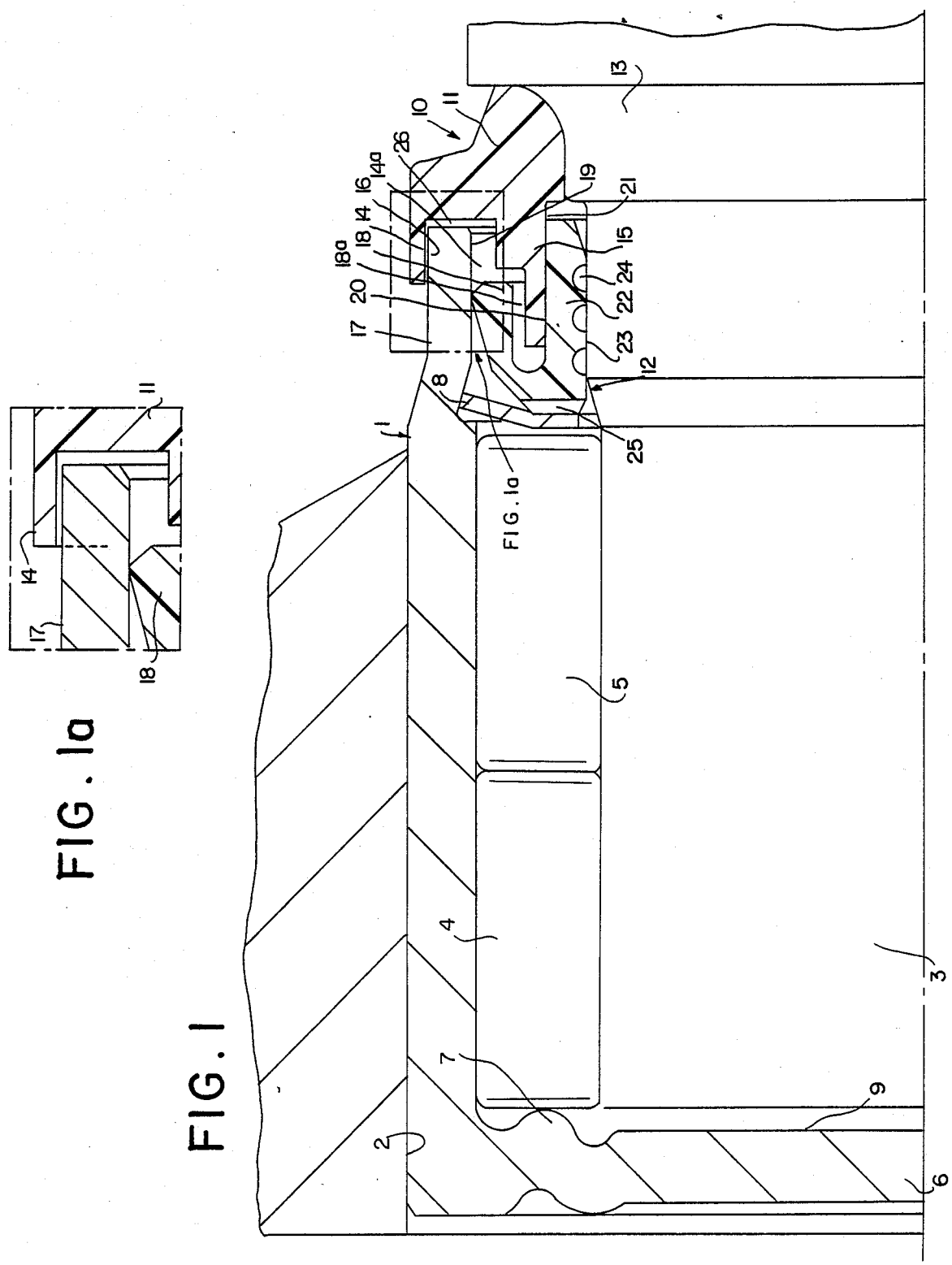

4,903,971

SEAL FOR BEARING BUSHINGS

FIELD OF THE INVENTION

The present invention relates to seals for bearing bushings. More specifically the invention relates to a novel improvement in seals located between the bearing bushing and a journal of a machine part supported therein.

BACKGROUND OF THE INVENTION

The seal of the present invention has particular application for the pin of a universal joint consisting of an inner sealing ring between the bearing bushing and the journal and an outer sealing ring located between the open end of the bearing bushing and a shoulder on the machine part supported therein and which has an axial section with a concentric bore on the side facing the inner sealing ring.

A seal of this general type is shown in West German Pat. No. 2,908,713. In the seal assembly shown in this German Patent, the inner sealing ring is located in the bearing bushing and rests with its sealing lips on the universal joint pin. In assemblies of this type wherein the inner sealing ring is on the universal joint pin, there is the danger that the section of the sealing ring which during assembly of the bearing bushing is pressed onto the universal joint pin will expand and lose its firm seating on the pin.

SUMMARY OF THE INVENTION

With the foregoing in mind, it is an object of the present invention to provide a seal for bearing bushings of this general type which is of relatively simple design and which is firmly seated on the joint pin. To this end in accordance with the present invention the inner sealing ring has a sleeve-like section which presses onto a stepped part of the pin wherein the pressed-on part is located in the bore of the outer sealing ring.

In accordance with another feature of the present invention, the outer sealing ring is mounted by way of an axial section with radial retension on the lateral surface of the bearing bushing before the seal is pressed onto a stepped part of the pin. By this arrangement the bearing parts are easily connected together to form a unit before installation. Furthermore, after installation, clearance is provided between the axial section of the outer sealing ring and the bearing bushing produced by expansion which occurs when the sealing ring is pressed onto the stepped part of the pin. By virtue of this the seal operates with very low friction.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a transverse sectional view of a bearing bushing incorporating a seal in accordance with the present invention; and FIG. 1a is a fragmentary view showing the gap between the sealing lip 14 and the surface 17 after assembly of the seal.

DETAILED DESCRIPTION OF THE PREFERRED EMBODIMENT

Referring now to the drawing, there is shown a bearing bushing generally designated by the numeral 1 mounted in the yoke eye 2 of a universal joint yoke assembly. Two rows of cylindrical rollers 4 and 5 are mounted between the bearing bushing and the universal joint pin 3. The rollers 4 confronting the bottom 6 of the bearing bushing 1 are in axial contact with a circumferential projection 7. The rolling element 5 is held in place axially by a spreader ring 8. Universal joint pin 3 is supported axially by bottom surface 9 of bearing bushing 1. A seal 10 closes the open end of the bearing bushing 1 which consists of an outer sealing ring 11 and an inner sealing ring 12. As illustrated outer sealing ring 11 comprises two axially inwardly directed annular sections 14 and 15 spaced apart radially to define an annular groove or slot 14$^a$ within which the terminal outer end of the bearing bushing 1 rests. Outer axial section 14 in the installed state rests firmly by its bore surface 16 on the lateral surface 17 of bearing bushing 1 and connects the bearing parts as a unit.

Inner sealing ring 12 comprises axially outwardly directed sections 18 and 22 radially spaced apart to define an annular gap 18$^a$ $^a$within which the inner axial section the outer sealing ring engages. The outer section defines a sealing lip 18 which engages bore surface 19 of bearing bushing 1 and is supported axially on spreader ring 8. Section 22 of inner ring 12 has a surface area 20 which confronts and engages bore 21 of inner axially oriented section 15. Accordingly, when the preassembled bearing bushing is pushed onto universal joint pin 3, the axial section 22 of inner ring 12 centers itself in bore 21 of the outer sealing ring 11 and is thus prevented from expanding. Note that the inner peripheral surface of axial section 22 of the inner sealing ring 12 has a series of circumferentially extending axially spaced grooves 24 to facilitate pressing the inner sealing ring onto the universal joint pin 3 more easily. The axial outer section 14 of the outer sealing ring 11 expands when the sealing ring 11 is pressed onto the step 13 of universal joint pin 3 to produce a sealing gap between the bearing bushing 1 and outer sealing ring 11. In this manner a low friction seal is created.

When bearing bushing 1 is relubricated from time to time, old grease lubricant is forced through one or more of the radial grooves 25 in inner sealing ring 12 and passes through the gap between sealing lip 18 and bearing bushing 1 and through radial openings 26 in the end surface of sealing ring 11. The path further includes passage through a gap between the bearing bushing 1 and axial section 14 of the outer sealing ring to the ambient outside atmosphere. The route described is also a passageway for air which must escape when the bearing bushing 1 is pressed onto universal joint pin 3.

Even though a particular embodiment of the invention has been illustrated and described herein, it is not intended to limit the invention and changes and modifications may be made therein within the scope of the following claims. For example, inner axial section 15 of outer sealing ring 11 can be provided with elastic sections which can either be formed plastically out of the material itself or by separate pieces simply placed in position. These elastic sections would serve the function of pressing sealing lip 18 radially outwardly with a greater force against the bore surface 19.

What is claimed is:

1. Seal for sealing the space between a bearing bushing (1) and the journal (3) of a machine part supported therein, the seal comprising inner sealing ring member (12) between the bearing bushing (1) and journal (3) and an outer sealing ring member (11) located between the open end of the bearing bushing (1) and a shoulder of the machine part supported in the bearing bushing, said inner sealing ring member (12) having a sleeve like section (22) mounted on a stepped portion of the journal (3), the outer sealing ring member (11) having a pair of circumferentially extending axially spaced sealing lip sections (14,15), the outermost lip section (14) confronting and engaging with pretension an outer surface 17 of the bearing bushing (1) in the preassembled state and being displaced radially upon assemly on the joint pin (3) to provide a gap between the outermost lip section (14) and said outer surface (17), the innermost sealing lip section (15) overlying and snugly seated on the sleeve like section (22).

2. Seal according to claim 1, including at least one groove (24), in the bore of the inner sealing ring (12).

3. Seal according to claim 2, including a plurality of grooves (24) located at intervals from each other in the axial direction.

4. A seal as claimed in claim 1 including at least one radial groove (25) in the inner sealing ring member defining a lubricant flow passage to permit flow of lubricant to pass through the groove (25) to the gap between the outermost sealing lip section (14) and outer sealing lip section (15) ring member.

* * * * *